United States Patent
Hamatani

(10) Patent No.: US 8,102,653 B2
(45) Date of Patent: Jan. 24, 2012

(54) ELECTRIC UNIT HAVING CAPACITOR

(75) Inventor: Takashi Hamatani, Nishikamo-gun (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 195 days.

(21) Appl. No.: 12/528,009

(22) PCT Filed: Mar. 18, 2008

(86) PCT No.: PCT/JP2008/055631
§ 371 (c)(1),
(2), (4) Date: Aug. 20, 2009

(87) PCT Pub. No.: WO2008/123269
PCT Pub. Date: Oct. 16, 2008

(65) Prior Publication Data
US 2010/0014252 A1    Jan. 21, 2010

(30) Foreign Application Priority Data

Mar. 19, 2007   (JP) ................................. 2007-070644

(51) Int. Cl.
H05K 7/20 (2006.01)
(52) U.S. Cl. ........................................ 361/699; 361/715
(58) Field of Classification Search ................... 361/699
See application file for complete search history.

(56) References Cited

U.S. PATENT DOCUMENTS

| | | | | |
|---|---|---|---|---|
| 3,790,860 A | * | 2/1974 | Verdisco | 361/695 |
| 3,934,177 A | * | 1/1976 | Horbach | 361/709 |
| 4,702,825 A | * | 10/1987 | Selvaggi et al. | 209/224 |
| 5,001,420 A | * | 3/1991 | Germer et al. | 324/142 |
| 5,249,469 A | * | 10/1993 | Jonsson et al. | 73/724 |
| 5,526,234 A | * | 6/1996 | Vinciarelli et al. | 361/740 |
| 6,501,662 B2 | | 12/2002 | Ikeda | |
| 7,289,329 B2 | * | 10/2007 | Chen et al. | 361/707 |
| 7,417,861 B2 | * | 8/2008 | Kikuchi et al. | 361/718 |
| 7,440,283 B1 | * | 10/2008 | Rafie | 361/709 |
| 2003/0053294 A1 | * | 3/2003 | Yamada et al. | 361/699 |
| 2006/0044762 A1 | | 3/2006 | Kikuchi et al. | |
| 2008/0049476 A1 | * | 2/2008 | Azuma et al. | 363/131 |
| 2008/0225487 A1 | * | 9/2008 | Nakajima et al. | 361/699 |

FOREIGN PATENT DOCUMENTS

DE        298 19 349 U1     12/1999
(Continued)

OTHER PUBLICATIONS

Office Action dated Jul. 1, 2011, issued in corresponding German Patent Application No. 11 2008 000 691.1.

Primary Examiner — Gregory Thompson
(74) Attorney, Agent, or Firm — Sughrue Mion, PLLC

(57) ABSTRACT

A PCU has an inside sealed by a case made of aluminum and a bottom plate. Interior space of the PCU accommodates an IPM, a control substrate, and a capacitor. The IPM is provided to abut an upper surface of the bottom plate. The control substrate is a rectangular plate having mounted thereon a control circuit including electronic components such as a gate driver, a transformer and the like, and is provided above the IPM. The capacitor is accommodated in a housing in a substantially parallelepiped form. A reflector made of aluminum of high thermal reflectivity and high thermal conductivity is provided on the entire lower surface of the capacitor.

7 Claims, 8 Drawing Sheets

FOREIGN PATENT DOCUMENTS

| | | |
|---|---|---|
| DE | 10 2005 041 051 A1 | 3/2006 |
| JP | 07-283071 A | 10/1995 |
| JP | 08-329731 A | 12/1996 |
| JP | 10-295087 A | 11/1998 |
| JP | 2000-060145 A | 2/2000 |
| JP | 2004-312925 A | 11/2004 |
| JP | 2005-259787 A | 9/2005 |

* cited by examiner

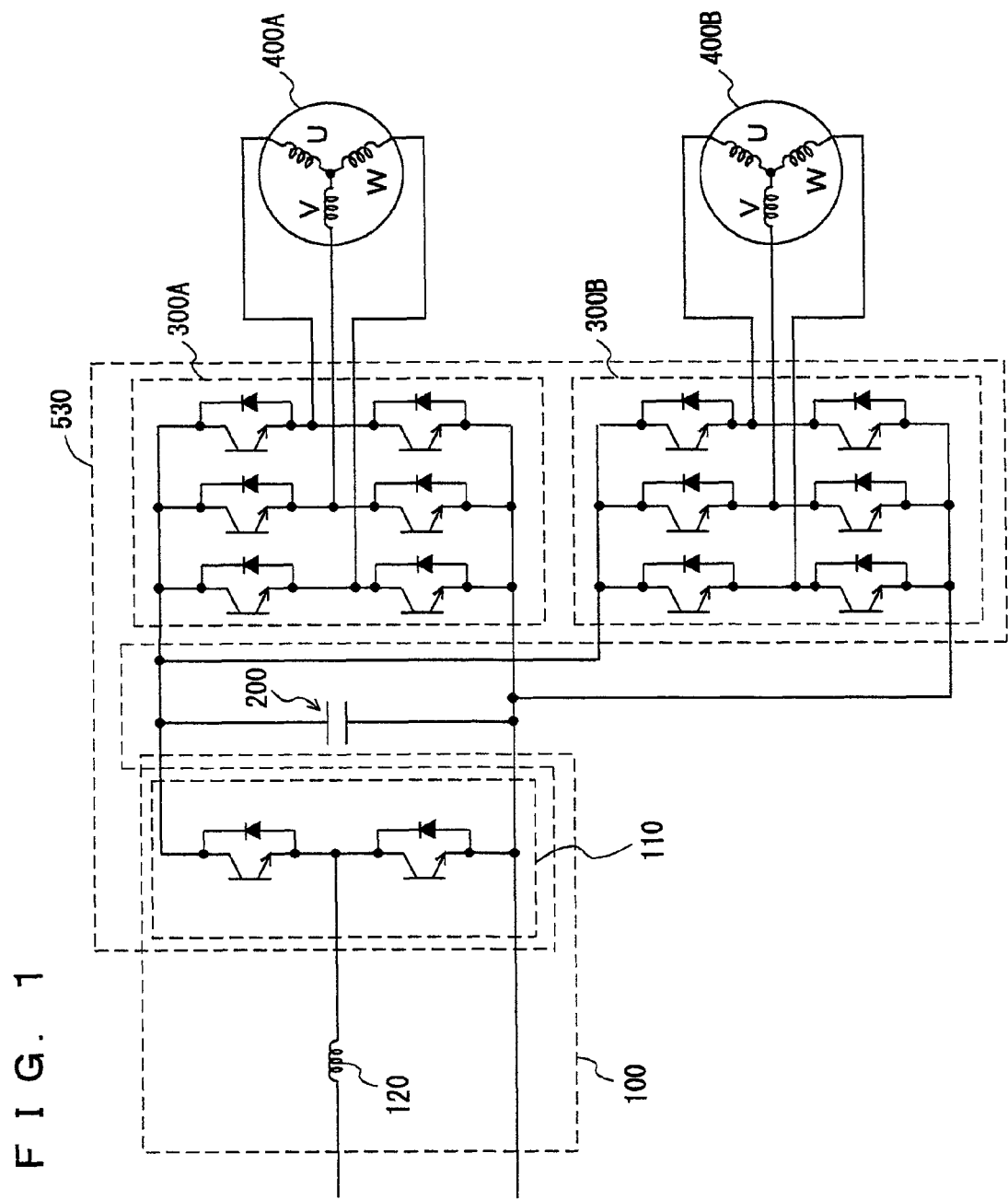
F I G. 1

F I G. 4
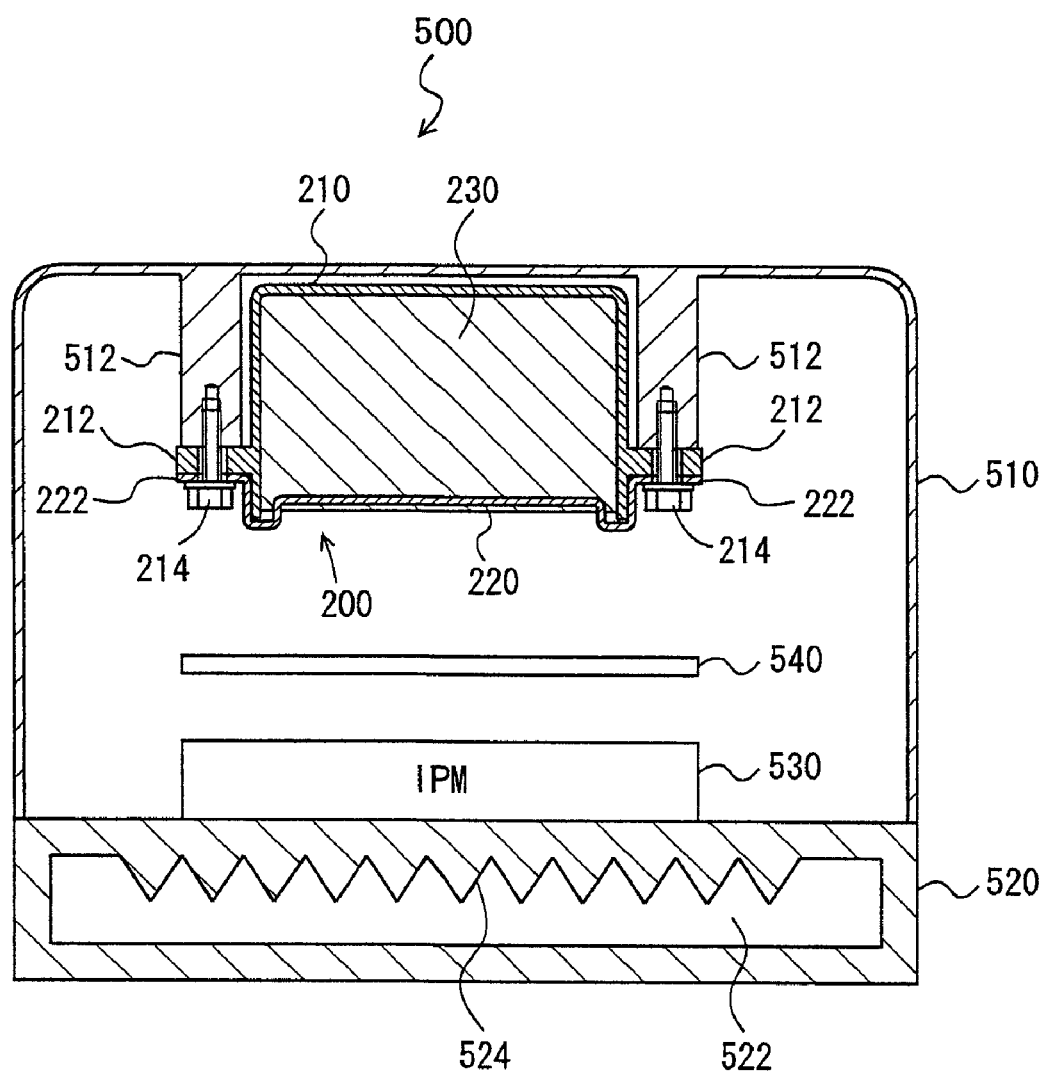

ELECTRIC UNIT HAVING CAPACITOR

TECHNICAL FIELD

The present invention relates to an electric unit having a capacitor, and more particularly to an electric unit accommodating a capacitor and an electronic component different from the capacitor within a casing.

BACKGROUND ART

Electric cars and hybrid vehicles having a motor as a driving source have been put to practical use. Electric power from a battery is boosted and converted to be supplied to the motor. Electronic components (e.g. a semiconductor element constituting an inverter) for supplying the electric power to the motor are usually accommodated in a casing and protected from the outside. In recent years, from the viewpoint of securing of space, there has been a demand for miniaturization of the casing for accommodating the electronic components for supplying the electric power to the motor. Such a technique of miniaturizing the casing is disclosed in Japanese Patent Laying-Open No. 2004-312925, for example.

Electric equipment disclosed in Japanese Patent Laying-Open No. 2004-312925 includes an inverter circuit, a case having an open upper portion and storing the inverter circuit in a lower portion, a capacitor connected to the inverter circuit, and a housing storing the capacitor. The housing storing the capacitor is connected to an upper peripheral surface of the case storing the inverter circuit. An inverter control substrate is provided between the inverter and the capacitor.

According to the electric equipment disclosed in Japanese Patent Laying-Open No. 2004-312925, the upper opening of the case storing the inverter can be closed by the housing storing the capacitor. Thus, the capacitor, the inverter circuit and the inverter control substrate can be protected from the outside without providing a member only for closing the opening of the case. Space for the member only for closing the opening of the case can thus be reduced, which leads to miniaturization of the electric equipment.

In the electric equipment disclosed in Japanese Patent Laying-Open No. 2004-312925, however, consideration is not given to an effect of a heat ray from the inverter circuit and the like upon the capacitor. Namely, the inverter circuit and a circuit mounted on the inverter control substrate generate heat through electrical conduction, and radiate a heat ray. When the emitted heat ray is absorbed into the capacitor to increase a temperature of the capacitor, performance of the capacitor may deteriorate. In particular, with a tendency toward an even shorter distance between an inverter circuit and the like and a capacitor as cases become miniaturized, the effect of a heat ray from the inverter circuit and the like upon an increase in temperature of the capacitor tends to be greater.

DISCLOSURE OF THE INVENTION

The present invention was made in order to solve the above problems, and an object thereof is to provide an electric unit accommodating a capacitor and an electronic component different from the capacitor within a casing, and being capable of suppressing an increase in temperature of the capacitor.

An electric unit according to the present invention includes a capacitor, a casing for accommodating the capacitor, an electronic component accommodated in the casing, generating heat by carrying out a function through electrical conduction, and a reflector provided between the electronic component and the capacitor, for reflecting heat radiated from the electronic component.

According to the present invention, the capacitor and the electronic component are accommodated within the casing. This electronic component generates heat through electrical conduction. The reflector for reflecting heat (heat ray) radiated from the electronic component is provided between the electronic component and the capacitor. Therefore, even if the electronic component generates heat and radiates a heat ray, the heat ray radiated toward the capacitor is prevented from being directly absorbed into the capacitor. As a result, an electric unit accommodating a capacitor and an electronic component in a casing and being capable of suppressing an increase in temperature of the capacitor can be provided.

Preferably, a material of high thermal reflectivity and high thermal conductivity is used as a material for the reflector. The reflector is connected to the casing while abutting the capacitor.

According to the present invention, a material for the reflector has high thermal reflectivity and high thermal conductivity. Further, the reflector is connected to the casing while abutting the capacitor. As such, the heat ray radiated from the electronic component can be reflected by the reflector, and heat of the capacitor can be actively transmitted to the casing through the reflector. Therefore, an increase in temperature of the capacitor can be suppressed further.

Still preferably, the reflector is connected to the casing by a fastening member of high thermal conductivity.

According to the present invention, the reflector is connected to the casing by the fastening member of high thermal conductivity. Therefore, the heat of the capacitor transmitted to the reflector can be transmitted to the casing through the coupling member.

Still preferably, a material for the reflector is aluminum.

According to the present invention, with the reflector made of aluminum of high thermal reflectivity and high thermal conductivity, most of the heat ray from the electronic component can be reflected, and most of the heat of the capacitor can be transmitted to the casing.

Still preferably, the capacitor abuts the casing.

According to the present invention, as the capacitor abuts the casing, the heat of the capacitor is directly transmitted to the casing. Therefore, an increase in temperature of the capacitor can be suppressed further.

Still preferably, the casing includes a wall surface provided with a coolant passage on an outer side.

According to the present invention, the wall surface of the casing is cooled by the coolant passage, so that the heat dissipated into the casing from the electronic component is transmitted to the casing in a higher amount. An increase in temperature inside the casing is thus suppressed, thereby suppressing an increase in temperature of the capacitor.

Still preferably, the electronic component is a semiconductor element abutting an inner side of the wall surface.

According to the present invention, heat of the semiconductor element is transmitted to the coolant passage through the wall surface, so that an amount of heat dissipated into the casing from the semiconductor element can be reduced. An increase in temperature inside the casing is thus suppressed further, thereby further suppressing an increase in temperature of the capacitor.

Still preferably, the electric unit includes a semiconductor element abutting an inner side of the wall surface. The electronic component is an electronic component mounted on a substrate provided on an inner side of the casing relative to the semiconductor element, for controlling the semiconductor element.

According to the present invention, the heat ray radiated from the electronic component provided on an inner side of the casing relative to the semiconductor element, for controlling the semiconductor element, can be reflected by the reflector.

BRIEF DESCRIPTION OF THE DRAWINGS

FIG. 1 is a diagram of a circuit for driving a motor of a hybrid vehicle having mounted thereon a PCU according to the present embodiment.

FIG. 4 is a cross-sectional view of the PCU according to the embodiment of the present invention.

BEST MODES FOR CARRYING OUT THE INVENTION

Figure 2:
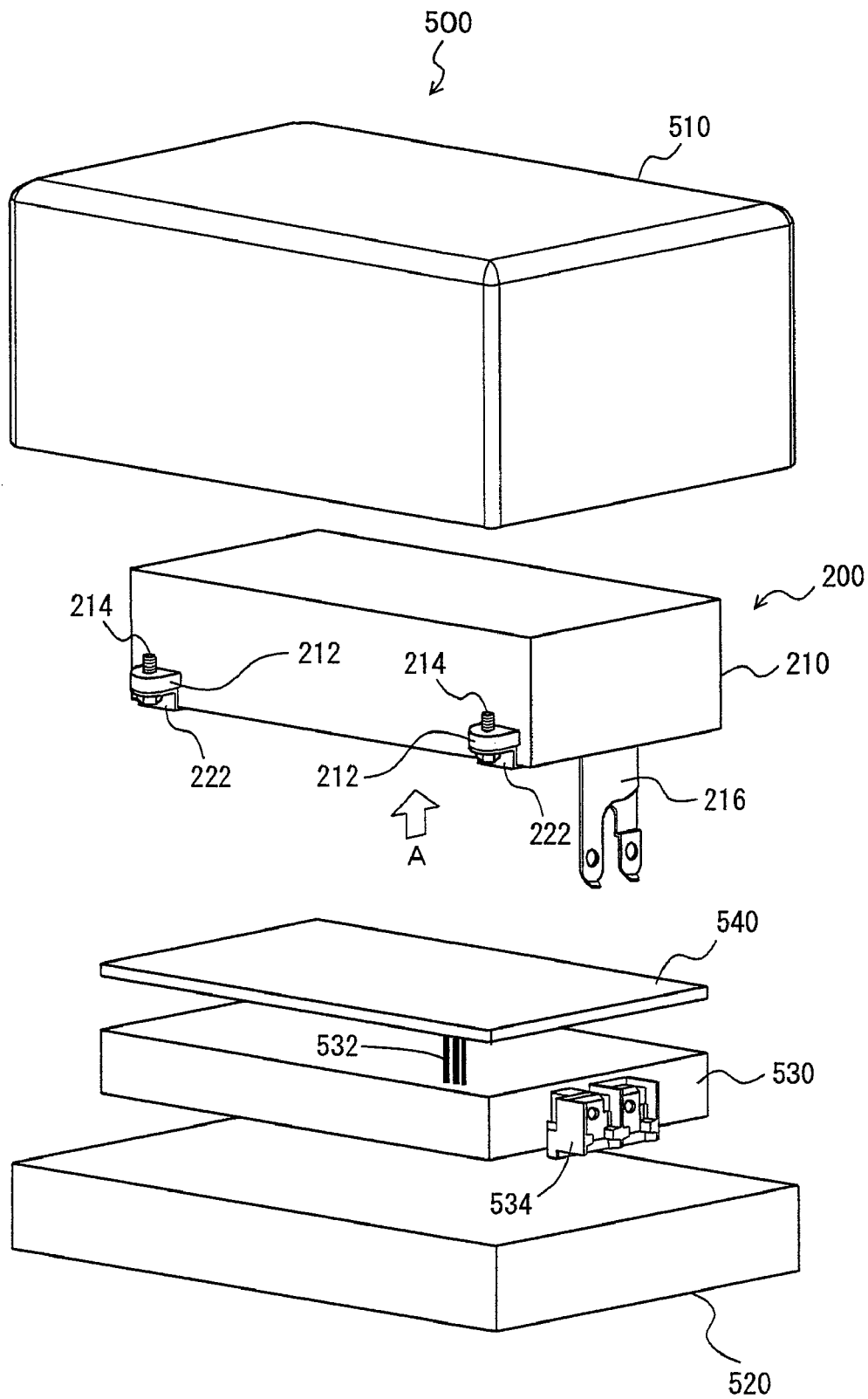
FIGS. 2 and 3 show a PCU according to an embodiment of the present invention.

Embodiments of the present invention will be described below with reference to the drawings. In the following description, the same components are designated with the same characters. Their names and functions are also the same. Accordingly, detailed descriptions thereof will not be repeated.

Referring to FIG. 1, a circuit for driving a motor of a hybrid vehicle having mounted thereon a power control unit (hereinafter also referred to as a PCU) 500 according to the present embodiment will be described. It is noted that the vehicle on which PCU 500 is mounted is not limited to a hybrid vehicle, but may be an electric car. Further, the power control unit according to the present invention is not limited to be mounted on a vehicle.

This circuit for driving a motor includes a boost converter 100, a capacitor 200, IPMs 300A, 300B for an inverter, and motor generators 400A, 400B.

Boost converter 100 includes a boost IPM 110 and a reactor 120. Boost IPM 110 includes two IGBTs (Insulated Gate Bipolar Transistors), and two diodes connected in parallel to the IGBTs, respectively, to allow a current flow from an emitter side to a collector side of the IGBTs. Reactor 120 has one end connected to a power supply line of a battery for running, and the other end connected to a midpoint between the two IGBTs of boost IPM 110.

Boost converter 100 boosts a direct-current voltage supplied from the battery for running and supplies the resultant voltage to capacitor 200, by turning on/off (electrical conduction/cutoff) a gate of each IGBT of boost IPM 110 in response to an instruction signal from a not-shown ECU (Electronic Control Unit). In addition, during regenerative braking of the hybrid vehicle, boost converter 100 down-converts a DC voltage generated by motor generators 400A, 400B for driving the vehicle and converted by IPMs 300A, 300B for an inverter, and supplies the resultant voltage to the battery for running. It is noted that well-known techniques may be employed for boost converter 100 and each IGBT, and thus further detailed descriptions will not be repeated here.

Capacitor 200 smoothes the voltage of the DC power supplied from boost converter 100, and supplies the smoothed DC power to IPMs 300A, 300B for an inverter. It is noted that capacitor 200 generates heat through electrical conduction.

IPMs 300A, 300B for an inverter include six IGBTs (Insulated Gate Bipolar Transistors), and six diodes connected in parallel to the IGBTs, respectively, to allow a current flow from an emitter side to a collector side of the IGBTs. IPMs 300A, 300B for an inverter convert the direct current supplied from the battery for running to an alternating current and supply the resultant current to motor generators 400A, 400B, by turning on/off (electrical conduction/cutoff) a gate of each IGBT in response to an instruction signal from the ECU. It is noted that well-known techniques may be employed for IPMs 300A, 300B for an inverter and the IGBTs, and thus further detailed descriptions will not be repeated here.

Each IGBT constituting boost IPM 110 and IPMs 300A, 300B for an inverter generates heat when its gate is turned on/off (electrical conduction/cutoff). It is noted that, in the following description, boost IPM 110 and IPMs 300A, 300B for an inverter are also referred to as an IPM 530 provided as a single module. It is noted that boost IPM 110 and IPMs 300A, 300B for an inverter are not necessarily limited to be provided as a single module. IPM 530 generates heat more than capacitor 200.

Figure 3:
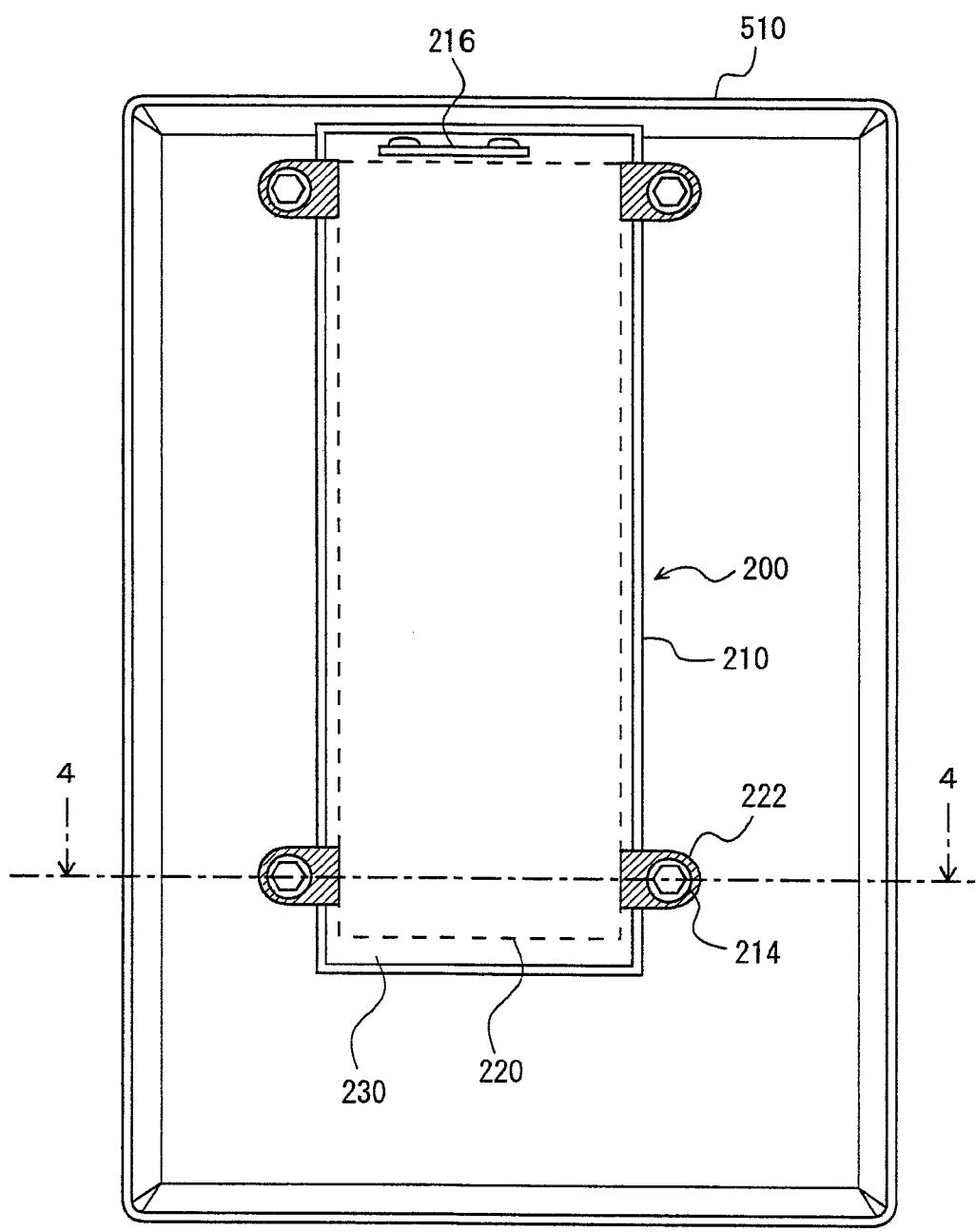

Referring to FIGS. 2 to 4, PCU 500 according to the present embodiment will be described. As shown in FIG. 2, PCU 500 has an inside sealed by a case 510 made of aluminum and a bottom plate 520.

Case 510 is a casing in a substantially parallelepiped form with an open lower portion. A lower peripheral surface of case 510 and bottom plate 520 are fixed with bolts (not shown) to abut each other.

Interior space of PCU 500 formed by case 510 and bottom plate 520 accommodates IPM 530, a control substrate 540, and capacitor 200.

IPM 530 is provided to abut an upper surface of bottom plate 520. It is noted that IPM 530 may be provided to abut the upper surface of bottom plate 520 with a heat radiation plate (not shown) interposed therebetween.

Control substrate 540 is a rectangular plate having mounted thereon a control circuit including electronic components such as a gate driver, a transformer and the like, and is provided above IPM 530. Control substrate 540 is electrically connected to IPM 530 via connection lines 532. In response to an instruction signal from the ECU, the control circuit mounted on control substrate 540 generates a control signal for controlling on and off of each IGBT of IPM 530, and sends the control signal to IPM 530. IPM 530 is controlled based on this control signal, so that outputs from motor generators 400A, 400B are controlled. The control circuit mounted on control substrate 540 generates heat through electrical conduction. It is noted that the electronic components mounted on control substrate 540 are not limited to a control circuit for IPM 530, provided that they are electronic components that generate heat through electrical conduction.

Capacitor 200 is accommodated in a housing 210 in a substantially parallelepiped form. On an outer side of a side surface of housing 210, a seating surface portion 212 through which a fixing bolt 214 passes is provided. As will be described later, fixing bolt 214 is fastened to a projection 512 (see FIG. 4) projecting downward from an inner side of an upper surface of case 510. As a result, capacitor 200 is fixed to case 510, with capacitor 200 being positioned above control substrate 540. A metal of high thermal conductivity (e.g. aluminum) is used as a material for fixing bolt 214.

A busbar 216 projecting downward from a lower surface of capacitor 200 and a connection terminal 534 provided on a side surface of IPM 530 are connected to each other, so that capacitor 200 and IPM 530 are electrically connected to each other.

FIG. 3 shows capacitor 200 and case 510 viewed in a direction of an arrow A in FIG. 2. As shown in FIG. 3, housing 210 of capacitor 200 is filled with a potting material 230 made of resin having a capacitor element body (not shown) buried therein.

A substantially rectangular reflector 220 is buried in potting material 230 below the capacitor element body. Thus, reflector 220 is provided between the control circuit mounted on control substrate 540 and the capacitor element body while abutting capacitor 200. Reflector 220 is provided on the entire lower surface of capacitor 200. Aluminum of high thermal reflectivity and high thermal conductivity is used as a material for reflector 220. It is noted that the material for reflector 220 is not specifically limited to aluminum, provided that it is a material of high thermal reflectivity and high thermal conductivity. An end portion 222 protruding to the outside of potting material 230 is provided at four corners of reflector 220.

FIG. 4 is a cross-sectional view of PCU 500 cut along a plane indicated by alternate long and short dashed lines in FIG. 3. As shown in FIG. 4, fixing bolt 214 is fastened to projection 512 projecting downward from the inner side of the upper surface of case 510, with seating surface portion 212 of housing 210 and end portion 222 of reflector 220 interposed therebetween. Thus, seating surface portion 212 of housing 210 abuts case 510. A head of fixing bolt 214 abuts reflector 220, and a shaft portion of fixing bolt 214 abuts case 510.

A coolant passage 522 provided with a cooling fin 524 is provided inside bottom plate 520. Coolant (hereinafter also referred to as LLC (Long Life Coolant)) flows through coolant passage 522. The LLC absorbs heat transmitted from IPM 530 and case 510 through cooling fin 524 and the like as it flows along coolant passage 522. Namely, the heat of IPM 530 and case 510 is dissipated to the LLC flowing through coolant passage 522. The LLC circulates between a radiator (not shown) and coolant passage 522 by an electric water pump (not shown). Heat of the LLC is dissipated to the outside air through the radiator (not shown).

A flow of heat inside PCU 500 according to the present embodiment based on the above structure will be described.

PCU 500 accommodates capacitor 200, IPM 530 and control substrate 540 therein. IPM 530 and the control circuit mounted on control substrate 540 generate heat through electrical conduction. Reflector 220 made of aluminum of high thermal reflectivity is provided between the control circuit mounted on control substrate 540 and the capacitor element body.

Figure 5:
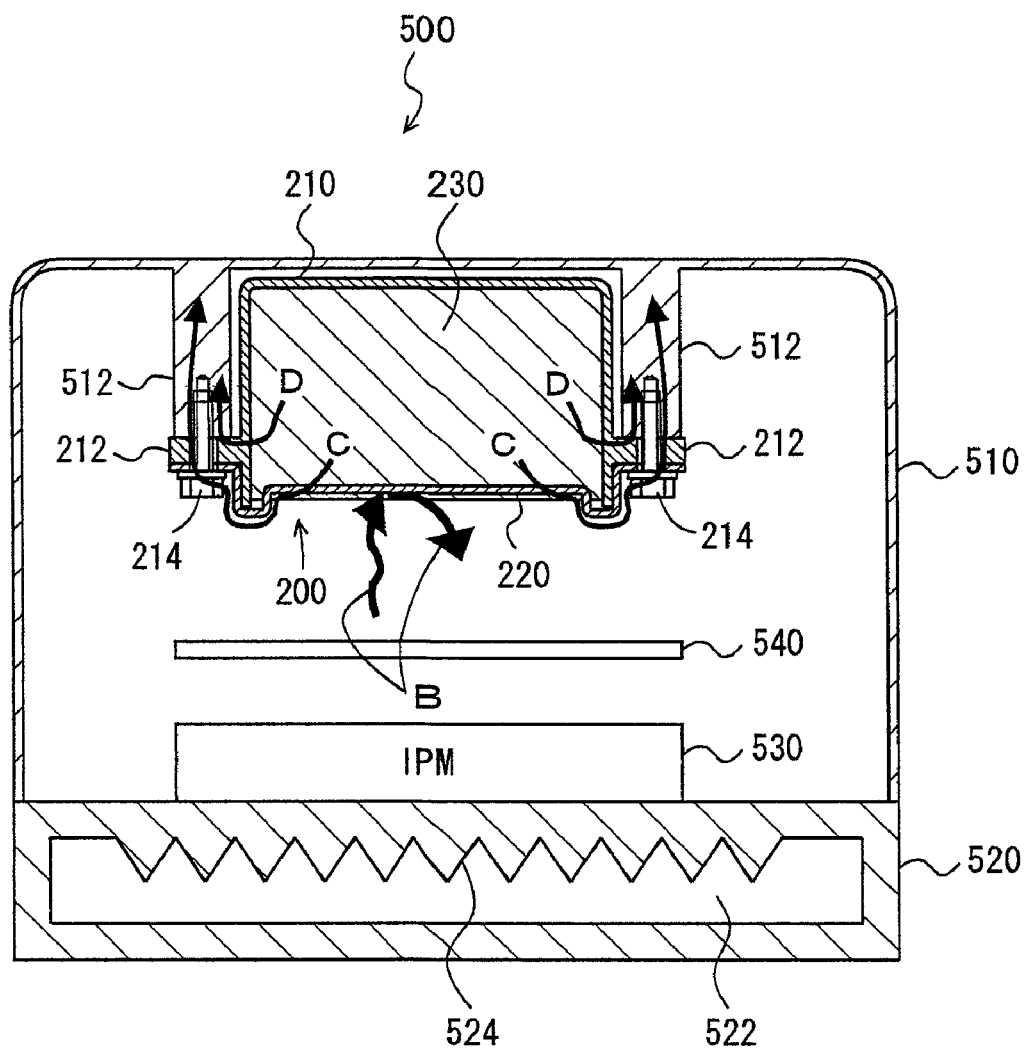
FIG. 5 illustrates a flow of heat in the PCU according to the embodiment of the present invention.

Therefore, even if IPM 530 and the control circuit mounted on control substrate 540 generate heat and radiate a heat ray, as shown by an arrow B in FIG. 5, the heat ray radiated toward capacitor 200 is reflected by reflector 220 and prevented from being directly absorbed into the capacitor element body. As a result, an increase in temperature of capacitor 200 can be suppressed, thereby suppressing deterioration of performance of capacitor 200.

Further, the lower peripheral surface of case 510 abuts bottom plate 520 provided with coolant passage 522. Therefore, case 510 is cooled by bottom plate 520. End portion 222 of reflector 220 is connected to projection 512 of case 510 thus cooled, through fixing bolt 214 made of the metal of high thermal conductivity. Reflector 220 of high thermal conductivity is buried in potting material 230 to abut capacitor 200. Therefore, as shown by an arrow C in FIG. 5, heat of capacitor 200 can be actively transmitted from reflector 220 abutting capacitor 200 to case 510 through fixing bolts 214. As a result, an increase in temperature of capacitor 200 can be suppressed further.

Moreover, seating surface portion 212 provided on housing 210 of capacitor 200 directly abuts projection 512 of case 510. Therefore, as shown by an arrow D in FIG. 5, the heat of capacitor 200 is transmitted directly to case 510 through seating surface portion 212. As a result, an increase in temperature of capacitor 200 can be suppressed further.

Furthermore, since IPM 530 abuts bottom plate 520, most of the heat generated at IPM 530 is transmitted to the LLC flowing through coolant passage 522 provided inside bottom plate 520. Therefore, an amount of heat dissipated into PCU 500 from IPM 530 is reduced. Further, since case 510 is cooled by bottom plate 520 as described above, the heat dissipated into PCU 500 from IPM 530 is transmitted to case 510 in a higher amount. An increase in temperature inside PCU 500 can thus be suppressed, thereby suppressing an increase in temperature of capacitor 200.

As described above, according to the PCU of the present embodiment, the reflector made of aluminum of high thermal reflectivity is provided between the IPM, the control circuit controlling the IPM and the capacitor. Therefore, a heat ray radiated from the IPM and the control circuit is reflected by the reflector and prevented from being directly absorbed into the capacitor. As a result, an increase in temperature of the capacitor can be suppressed, thereby suppressing deterioration of the performance of the capacitor.

<First Variation>

Figure 6:
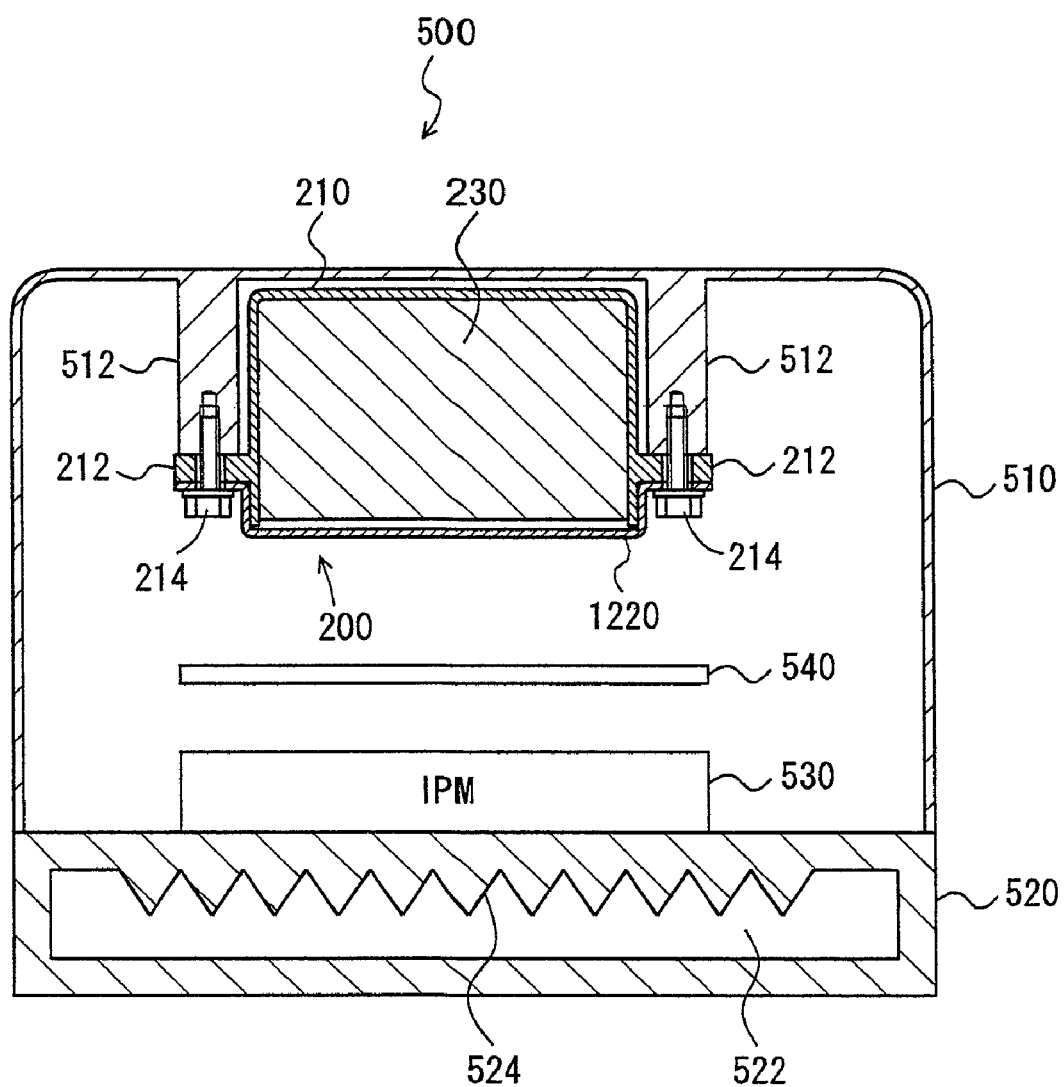
FIG. 6 is a cross-sectional view of a PCU according to a first variation of the embodiment of the present invention.

In the present embodiment, reflector 220 buried in potting material 230 has been described. In contrast, as a first variation according to the present embodiment, a reflector 1220 not buried in potting material 230 but covering the entire lower surface of capacitor 200 may be provided, as shown in FIG. 6. In this case, potting material 230 does not exist below reflector 1220, so that the heat ray can be further prevented from being directly absorbed into the capacitor element body as compared to reflector 220. In addition, reflector 1220 can be easily provided on the lower surface of capacitor 200 because reflector 1220 does not need to be buried in potting material 230.

<Second Variation>

Figure 7:
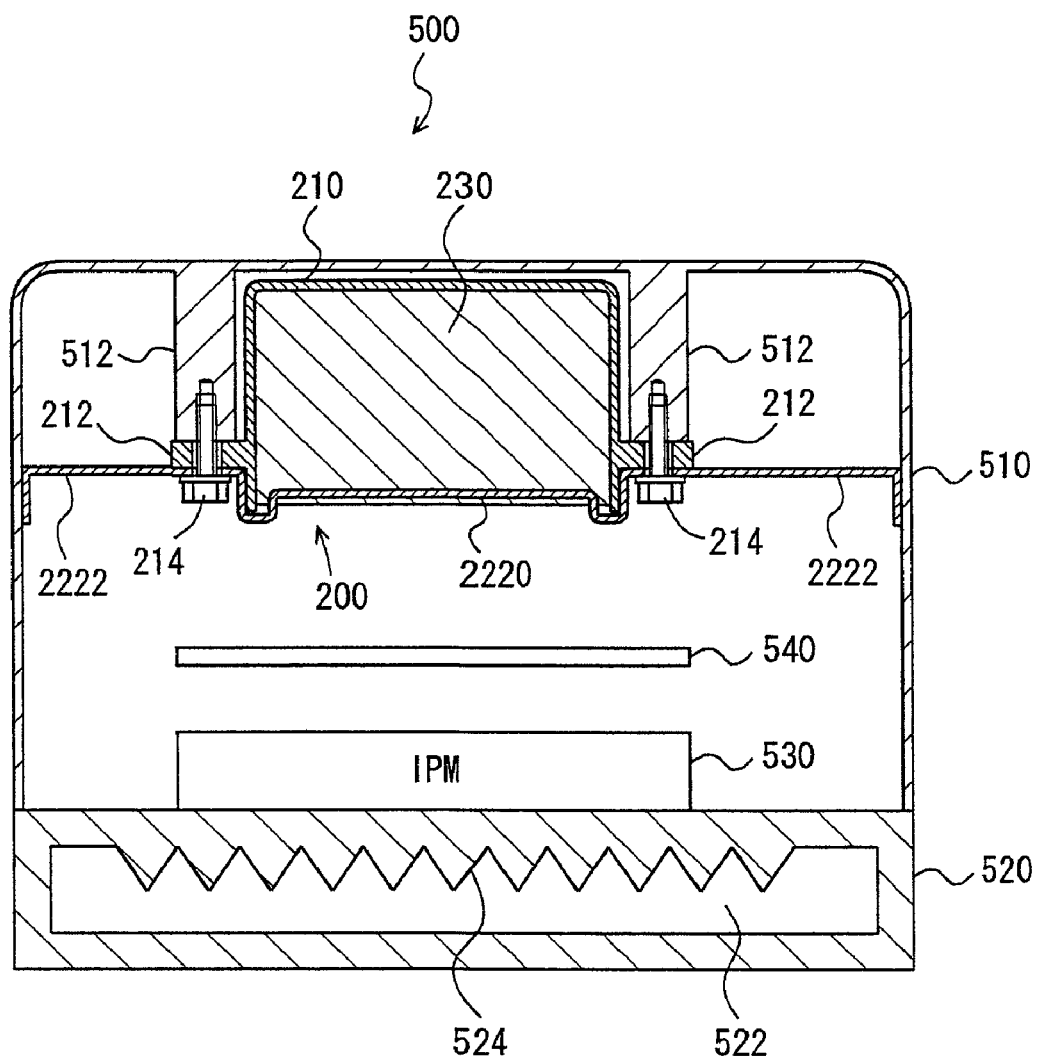
FIG. 7 is a cross-sectional view of a PCU according to a second variation of the embodiment of the present invention.

In the present embodiment, reflector 220 including end portions 222 connected to case 510 through fixing bolts 214 has been described. In contrast, as a second variation according to the present embodiment, a reflector 2220 including end portions 2222 which are connected to case 510 through fixing bolts 214 and extended to abut an inner side of a side surface of case 510 may be provided, as shown in FIG. 7. In this case, reflector 2220 abuts the side surface of case 510 closer to bottom plate 520 (coolant passage 522) than projection 512 provided on the upper surface of case 510, so that the heat of capacitor 200 can be more actively transmitted to case 510. As a result, an increase in temperature of capacitor 200 can be suppressed further.

<Third Variation>

Figure 8:
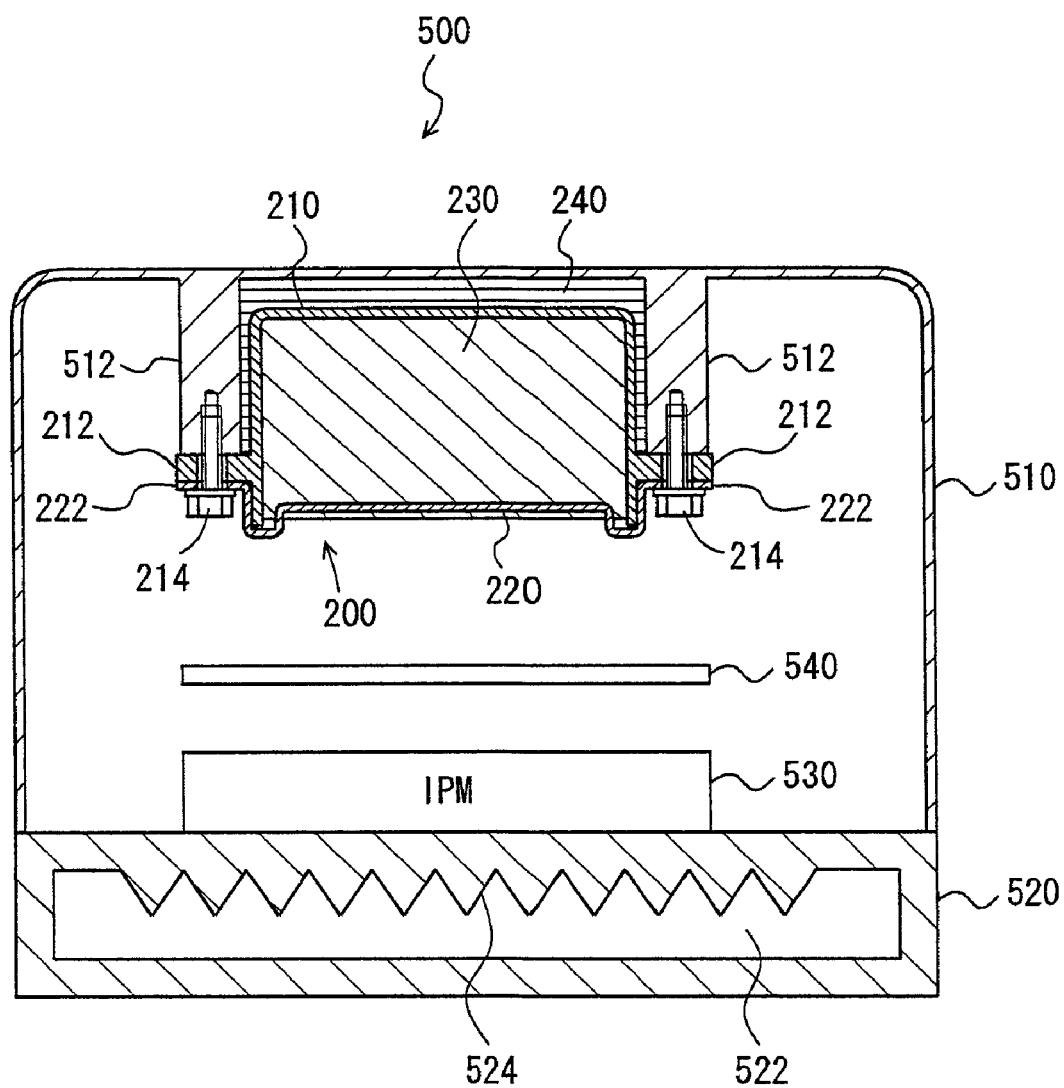
FIG. 8 is a cross-sectional view of a PCU according to a third variation of the embodiment of the present invention.

In the present embodiment, capacitor 200 where an outer side of an upper surface of housing 210 does not abut the inner side of the upper surface of case 510 has been described. In contrast, as a third variation according to the present embodiment, space between housing 210 and the upper surface of case 510 may be filled with a potting material 240 made of resin having higher thermal conductivity than air, as shown in FIG. 8. In this case, an amount of heat transmitted from housing 210 to case 510 is increased as compared to an amount in an example where air is present between housing 210 and the upper surface of case 510. As a result, an increase in temperature of capacitor 200 can be suppressed further.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. An electric unit comprising:
    a capacitor;
    a casing for accommodating said capacitor;
    an electronic component accommodated in said casing, generating heat by carrying out a function through electrical conduction; and
    a reflector provided between said electronic component and said capacitor, and connected to said casing by at least one fastening member while abutting said capacitor, for reflecting heat radiated from said electronic component, wherein
    said casing includes a first wall surface closer to said capacitor than said electronic component, and a second wall surface facing said first wall surface and being closer to said electronic component than said capacitor, and
    said reflector is connected to said first wall surface of said casing by said at least one fastening member while abutting said capacitor.

2. The electric unit according to claim 1, wherein
    said first wall surface includes a plurality of projections each projecting toward an interior of said casing, said capacitor is contained in space between said plurality of projections,
    said at least one fastening member is a plurality of fastening members, and each of said plurality of fastening members are provided correspondingly to said plurality of projections, and
    said plurality of fastening members are fastened to tip end portions of said plurality of projections with said reflector interposed therebetween, respectively, while abutting said reflector.

3. The electric unit according to claim 2, wherein
    seating surface portions formed to extend outward are provided on side surfaces of said capacitor correspondingly to said plurality of projections, and
    said plurality of fastening members are fastened to tip end portions of said plurality of projections with said reflector and further said seating surface portions interposed therebetween, respectively.

4. The electric unit according to claim 1, wherein
    a material of high thermal reflectivity and high thermal conductivity is used as a material for said reflector.

5. The electric unit according to claim 1, wherein
    a coolant passage is provided on an outer side of said second wall surface.

6. The electric unit according to claim 5, wherein
    said electronic component is a semiconductor element abutting an inner side of said second wall surface.

7. The electric unit according to claim 5, further comprising a semiconductor element abutting an inner side of said second wall surface, wherein
    said electronic component is an electronic component mounted on a substrate provided on an inner side of said casing relative to said semiconductor element, for controlling said semiconductor element.

* * * * *